C. A. J. ALBERT.
MEANS FOR PURIFYING WASTE OIL.
APPLICATION FILED JUNE 1, 1906.
929,266.
Patented July 27, 1909.
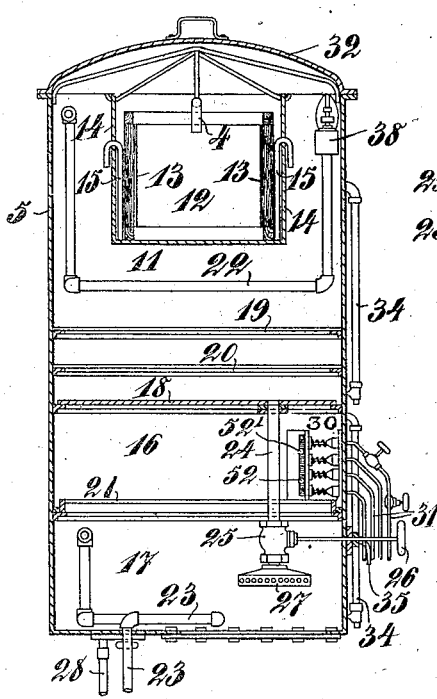
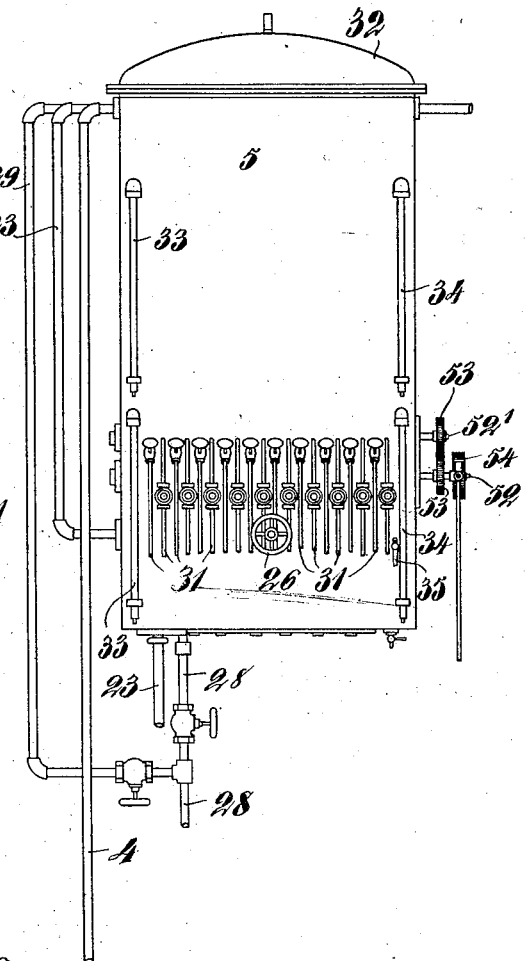

UNITED STATES PATENT OFFICE.

CARL ALBERT JULIUS ALBERT, OF KVILLEBÄCKSVÄGEN, GOTTENBORG, SWEDEN.

MEANS FOR PURIFYING WASTE OIL.

No. 929,266.   Specification of Letters Patent.   Patented July 27, 1909.

Application filed June 1, 1906. Serial No. 319,670.

*To all whom it may concern:*

Be it known that I, CARL ALBERT JULIUS ALBERT, a subject of the King of Sweden, and resident of Kvillebäcksvägen, Gottenborg, in the Kingdom of Sweden, have invented certain new and useful Improvements in Means for Purifying Waste Oil from Steam-Engines and the Like, of which the following is a specification, reference being had therein to the accompanying drawing.

This invention relates to means for purifying waste-oil from steam engines and the like and distributing the same in purified condition to the several parts of the engine to be lubricated.

The said oil is caught in a tank or receptacle of suitable form placed under the engine in question. From the said tank the oil is transferred in a suitable manner to the purifying apparatus itself and, having been purified in the same it is transferred in controllable quantities and in an entirely automatic manner to the parts of the engine to be lubricated. The said purifying apparatus consists of a tank divided into three special chambers, situated one above the other. In the upper chamber a purifying box is suspended, provided with vertical filters. The impure oil, having passed through the said filters is drawn by wicks over into the upper chamber. This is provided with heating tubes and with a plurality of filters. The oil is heated in the chamber last mentioned to 40° to 55° cent. and passes through the said filters and is then transferred to the lower chamber of the tank, which is provided with inlets for water as well as for steam. The oil is heated in the said chamber to 50° to 65° cent. and is washed by means of a solution of common salt. From the lower chamber the oil is forced by the pressure exerted upon the same by the oil in the upper chamber, into the intermediate chamber, passing through a double filter, separating the intermediate chamber and the lower chamber and effecting the final purifying operation. From the intermediate chamber the purified oil is then fed automatically by special measuring devices to the different parts of the engine to be lubricated. Consequently, as seen from the above, the purifying operation consists in the caught oil being first filtered, then heated to 40° to 55° cent. then filtered again, thereupon washed by means of water and common salt (a solution of common salt), then heated to 50° to 65° cent. and finally filtered.

In the accompanying drawings a plant is shown arranged in accordance with this invention and adapted to sea-steam engines.

Figure 1 is a front view of the purifying tank and Fig. 2 is a vertical section of the purifying tank.

The purifying apparatus comprises a tank 5 to which a pipe 4 leads from a waste oil receptacle (not shown herein). This tank 5 is divided into three chambers 11, 16, 17. In the upper chamber 11 of the tank a box 12 is suspended, into which the oil is led through the pipe 4. The said box has double walls 13, 14, vertical filters 13 forming the inner wall. After the oil has passed through the said filters it is drawn up by wicks 15, which are mounted in the space between the filters and the wall 14 and from which wicks it drops into the upper chamber 11 of the tank.

The upper chamber 11 and the intermediate chamber 16 are separated by a solid bottom 18. In the upper chamber 11 two single filters 19 and 20 are mounted in a detachable manner. The chambers 16 and 17 are separated by a double filter 21. In the upper chamber 11 a steam pipe 22 is provided for heating the oil, said pipe being connected with a pipe 23, which passes through the lower chamber 17. The chambers 11, 17 communicate through a pipe 24, provided with a cock or valve 25, operated by means of a wheel 26, and it is provided with a strainer 27. The oil, having passed through the filters 19, 20, passes through the said pipe 24 and is spread in the lower chamber 17 by the strainer 27. In the said chamber the oil is subjected to a washing operation as well as a heating operation. The washing operation is effected by means of common salt put into the chamber, and water, introduced through a pipe 28, having a branch 29 leading to the upper chamber 11, and the heating of the chamber 17 to 50° to 65° cent. is effected by the steam pipe 23. Owing to the pressure from the oil in the upper chamber 11, the oil in the lower chamber 17 is forced upward through the double filter 21 and enters the intermediate chamber 16, from which it is distributed by automatically operating measuring and lubricating mechanisms 30 into pipes 31 leading to the several parts of the engine to be lubricated.

The filters 19 and 20 and the bottom plate 18 can be taken out for cleaning from the top of the tank 5 after a cover 32 and the box 12 have been removed. The double filter 21 on the other hand is mounted in a frame which is inserted from the side of the tank. Thermometers 33, 33 are provided to indicate the temperature in the chambers 11 and 17 and gage-glasses 34, 34 are provided to indicate the levels of the oil in chambers 11 and 16 respectively. Oil can be drawn off through a cock 35 for direct lubrication if necessary.

The measuring and distributing mechanisms 30 may be of any suitable construction, well known by those skilled in the art. For that reason they are not particularly described. The said mechanisms are caused to operate by spindles 52, 52', which are rotated by a suitable mechanism as, for instance, a ratchet wheel and pawl mechanism driven by the engine, the ratchet wheel 54 being fixed on the spindle 52 and the spindles 52, 52' connected by a gearing 53, 53.

Having now described my invention, what I claim as new and desire to secure by Letters Patent is:

1. In an apparatus for purifying waste oil, a purifying tank divided into upper, lower and intermediate chambers, a purifying box in the upper chamber, means for supplying waste oil to said box, a filter in said box, wicks for drawing the oil from said box into the upper chamber, filters in said upper chamber, a pipe leading from the upper to the lower chamber, a filter between the lower and intermediate chambers and means for distributing the purified oil from the intermediate chamber.

2. In an apparatus for purifying waste oil, a purifying tank divided into upper, lower and intermediate chambers, a purifying box in the upper chamber, means for supplying waste oil thereto, a filter in said box, wicks for drawing the oil from said box into the upper chamber, filters in said upper chamber, a pipe leading from said upper chamber to the lower chamber, a filter between the lower and intermediate chambers, means for supplying heat to the oil within the upper and lower chambers and means for distributing the purified oil from the intermediate chamber.

3. In an apparatus for purifying waste oil, a purifying tank divided into upper, lower and intermediate chambers, a purifying box in the upper chamber, means for feeding the waste oil thereto, a filter in said box, wicks for feeding the oil from the box into the upper chamber, filters in said chambers, a pipe leading from the upper chamber to the lower chamber, a filter between the lower and intermediate chambers, means for supplying heat to the oil within the upper and lower chambers, means for introducing a solution of common salt into contact with the oil in the lower chamber and means for distributing the purified oil from the intermediate chamber.

In witness whereof I have hereunto signed my name this 14th day of May 1906, in the presence of two subscribing witnesses.

CARL ALBERT JULIUS ALBERT.

Witnesses:
F. JOHNSSON GÖTEBORG,
E. JOHNSON.